(12) United States Patent
Einighammer et al.

(10) Patent No.: US 8,045,768 B2
(45) Date of Patent: *Oct. 25, 2011

(54) METHOD AND DEVICE FOR RECOGNITION OF NATURAL SKIN

(75) Inventors: Hans Einighammer, Duesseldorf (DE); Jens Einighammer, legal representative, Starzach (DE); Isabelle Einighammer, legal representative, Tuebingen (DE); Mark Gilenko, Ulm (DE)

(73) Assignee: TST Biometrics Holding AG, Zürich (CH)

( * ) Notice: Subject to any disclaimer, the term of this patent is extended or adjusted under 35 U.S.C. 154(b) by 84 days.

This patent is subject to a terminal disclaimer.

(21) Appl. No.: 12/460,006

(22) Filed: Jul. 10, 2009

(65) Prior Publication Data
US 2009/0310827 A1    Dec. 17, 2009

Related U.S. Application Data

(63) Continuation of application No. 10/480,907, filed as application No. PCT/DE02/01861 on May 23, 2002, now Pat. No. 7,587,071.

(30) Foreign Application Priority Data

Jun. 13, 2001 (DE) .................................. 101 28 717

(51) Int. Cl.
*G06K 9/00* (2006.01)
*G06K 9/66* (2006.01)
*G06K 9/74* (2006.01)

(52) U.S. Cl. ........................... 382/124; 382/191; 356/71

(58) Field of Classification Search .................. 382/115, 382/124–126; 356/41; 340/5.1, 5.2; 283/68; 250/556
See application file for complete search history.

(56) References Cited

U.S. PATENT DOCUMENTS

| 5,177,802 | A  | * | 1/1993  | Fujimoto et al. ............. 382/124 |
| 5,419,321 | A  |   | 5/1995  | Evans |
| 5,598,843 | A  |   | 2/1997  | Caisey et al. |
| 5,737,439 | A  | * | 4/1998  | Lapsley et al. ................ 382/115 |
| 6,292,576 | B1 | * | 9/2001  | Brownlee ...................... 382/124 |
| 6,327,376 | B1 | * | 12/2001 | Harkin .......................... 382/124 |

(Continued)

FOREIGN PATENT DOCUMENTS

DE    198 18 229    10/1999

(Continued)

OTHER PUBLICATIONS

International Search Report for PCT/DE02/01861, dated Jan. 24, 2003.

*Primary Examiner* — Gregory M Desire
*Assistant Examiner* — Andrae S Allison
(74) *Attorney, Agent, or Firm* — Collard & Roe, P.C.

(57) ABSTRACT

The invention relates to a method for the recognition of natural skin (5), wherein the skin surface (4) is illuminated at an irradiation point (1) with light from the visible spectrum or the adjacent spectrum, wherein that part of the light entering through the skin surface (4) at the irradiation point (1), scattered in the skin (5), and exiting from the skin surface (4) again, is detected at a detection point (9), using a detector (20), and wherein the signal determined by the detector (20) is passed to a comparator and compared with stored data. Furthermore, a device for carrying out the method is an object of the invention.

27 Claims, 6 Drawing Sheets

U.S. PATENT DOCUMENTS

| | | | |
|---|---|---|---|
| 6,404,904 B1 * | 6/2002 | Einighammer et al. | 382/124 |
| 6,628,809 B1 * | 9/2003 | Rowe et al. | 382/115 |
| 7,113,622 B2 * | 9/2006 | Hamid | 382/124 |
| 2002/0097876 A1 * | 7/2002 | Harrison | 380/270 |
| 2003/0076492 A1 * | 4/2003 | Bradbury et al. | 356/301 |
| 2003/0226041 A1 * | 12/2003 | Palmer et al. | 713/202 |

FOREIGN PATENT DOCUMENTS

| | | |
|---|---|---|
| EP | 0 359 554 | 3/1990 |
| JP | 2001/167255 | 6/2001 |
| WO | WO 01/34027 | 5/2001 |

* cited by examiner

METHOD AND DEVICE FOR RECOGNITION OF NATURAL SKIN

CROSS REFERENCE TO RELATED APPLICATIONS

This application is a continuation of U.S. patent application Ser. No. 10/480,907 filed on Jul. 25, 2005, now U.S. Pat. No. 7,587,071, which application claims priority under 35 U.S.C. §119 of German Application No. 101 28 717.8 filed on Jun. 13, 2001 and under 35 U.S.C. §365 of PCT/DE02/01861 filed on May 23, 2002. The international application under PCT article 21(2) was not published in English.

BACKGROUND OF THE INVENTION

1. Field of the Invention

The invention relates to a method for the recognition of natural skin during contact-free biometric identification of a person, as well as to a device for carrying out the method.

2. Description of Related Art

In the checking of authorization with regard to access to closed systems, which can be represented by room complexes or data networks, for example, biometric checks are being performed, to an increasing degree, for identification of the person authorized for access, since there is no risk that the individual biometric characteristics of an individual can be lost or passed on, as is the case with passwords or keys. In practice, the use of the papillary line patterns of the palms or the fingertips, as a biometric characteristic that is different for every individual and does not change, has proven itself, whereby methods are known with which these papillary line patterns can be optically detected in contact-free manner. In the case of these measurements, the papillary line pattern is evaluated as such, in other words the topology of the skin surface or, to state it differently, the pattern of the relief formed by the papillary ridges, is evaluated. In this connection, there is the problem that when the papillary line pattern is known, the measurement apparatus for detecting the biometric data can, in principle, be deceived by means of false copies that contain a reproduction of the papillary line pattern in accordance with the three-dimensional original, and which are possible, for example, in the form of two-dimensional reproductions, three-dimensional reproductions, or coverings on natural fingers.

WO 01/34 027 A2 discloses a method that serves not for biometric identification, but rather for the diagnosis of skin diseases, with a related device, wherein the skin is illuminated by means of an illumination ring during the examination of skin lesions, in order to take pictures of the skin lesion, to digitalize them and evaluate them, which images are generated by means of scattered light.

EP 0 359 554 A2 describes a method for the identification of persons, wherein optical fingerprints are determined, which are brought into contact with a glass plate, in other words the method of working is not contact-free, and the glass plate is exposed to manipulation attempts and attempts to damage it, because of the accessibility that is absolutely required. In addition to the fingerprints, in order to prevent forgeries, an evaluation takes place, at the same time, as to whether there is an offset between the irradiation point and the point at which the light enters into the measurement apparatus.

U.S. Pat. No. 5,598,843 describes a device with which light is radiated in by direct contact with the skin, by means of a first emitter, which light is detected by a second emitter, which is separated from the first emitter by means of a non-transparent wall.

U.S. Pat. No. 5,419,321 also shows a non-invasive but contact-requiring sensor for optical, quantitative determination of a substance in living tissue.

SUMMARY OF THE INVENTION

The invention is based on the task of indicating a method with which the security of biometric methods using the evaluation of papillary line patterns for checking access authorization can be improved to prevent attempts at deception. It is furthermore the task of the invention to make available a device with which this method can be carried out.

This task is accomplished, with regard to the part of the invention that relates to the method, by means of a method for the recognition of natural skin during contact-free biometric identification of a person, wherein the skin surface is illuminated at an irradiation point assigned to a finger or the palm of the hand, with light from the visible spectrum or the adjacent spectrum, wherein several limited spectrum ranges are used for illuminating the irradiation point, wherein that part of the light entering through the skin surface at the irradiation point, scattered in the skin, and exiting from the skin surface again, is detected at a detection point, using a detector and, at the same time, the characteristic line patterns are determined optically, in contact-free manner, using a papillary line sensor, and wherein the signal determined by the detector is passed to a comparator and compared with stored data.

This method offers the advantage that optical properties of the natural skin are checked by means of measuring the scattered light, thereby precluding a large number of possibilities of deception of the type stated initially. For this purpose, the skin is illuminated, at the irradiation point, with a beam of light that is diffusely reflected at the surface, in part. The remaining part of the beam of light penetrates into the tissue of the skin, and is distributed in this volume by means of multiple scattering, whereby a fraction of this scattered light exits from the skin surface again and thereby makes the skin appear bright. Since natural skin is composed of complex organic structures and contains a large number of optically active substances, its optical properties, particularly with regard to scattering (Mie and Rayleigh scattering) and the absorption that can be determined using scattered light cannot be imitated, or can be imitated only with great effort.

It is particularly advantageous that the scattered light is detected at several spatially different detection points, which have a different distance from the irradiation point. Since the intensity of the scattered light decreases with an increasing distance from the irradiation source, according to a specific function, referred to as "scatter function" here, which is dependent not only on the distance but also dependent on the wavelength of the light used for irradiation, there is the possibility, using this method, of a stringent check as to whether the illuminated sample agrees with natural skin with regard to its scatter function, whereby it is impossible, according to the current level of knowledge, to reproduce this scatter function artificially, in precise manner, and to additionally provide the material used for an approximation to this scatter function with the surface profiling necessary for further reproduction of the papillary line pattern. The other great advantage is the further protection against attempts at deception, since the two measurements for detecting the papillary line pattern and the scattering behavior of natural skin take place practically at the same location and almost at the same time, and therefore there is no possibility of moving or replacing the measurement sample between the two measurements.

The security of the method according to the invention is further increased in that light from several limited spectrum ranges is used for illuminating the irradiation point, since these ranges can be coordinated with the optical properties, with regard to scattering and absorption, of substances that are present in the skin, in other words, light from spectrum ranges in which the absorption and scattering of a natural substance that naturally occurs in the skin assume characteristic values is used for illuminating the irradiation point.

It is advantageous, in this connection, if light from the spectrum ranges around 600 nm and around 800 nm is used for illuminating the irradiation point, since a great absorption jump in the hemoglobin as well as an absorption drop in the skin pigment melanin can be detected between these wavelengths, and furthermore, the varying oxygen saturation of the skin does not have any influence on the measurement. Another advantageous limited spectrum range for illuminating the skin at the irradiation point lies at about 1250 nm, whereby the water content of the tissue essentially determines the measurement result at this wavelength.

If the intensity of the light is modulated over time, so that alternating light is used, the method is not sensitive to ambient interference light that frequently cannot be completely eliminated by simple conventional measures such as shielding, for example.

Equally, there is the possibility that the scattered light is passed from the detection point to the detector by way of a light guide.

The part of the task that relates to the device is accomplished, according to the invention, in that a light source is provided for illuminating the skin surface at the irradiation point, detectors are provided for detection of the scattered light emitted at the detection points, a papillary line sensor having a camera for optical, contact-free determination of the characteristic line pattern of the skin, and a data processing unit, particularly a microprocessor that functions as a comparator, are provided. It is furthermore provided that the light source generates an illumination pattern on the skin that corresponds to an approximate or complete circular ring. This structure serves to improve the measurement security by means of forming the average of tissue non-homogeneities and the generation of sufficiently strong measurement signals, by means of superimposition of a larger number of similar individual scattered light distributions.

The illumination pattern that corresponds to the circular ring is generated, in simple and therefore preferred manner, in that an illumination ring is assigned to the light source. In the case of the illumination pattern that corresponds to the circular ring, it has been proven to be advantageous, in view of the greater intensity of the scattered light at a predetermined distance from the entry point, namely the radius R, if the detection point is assigned to the center of the circular ring, since the symmetry of illumination is utilized to achieve a strong measurement signal for the distance corresponding to the radius R, in this way.

To determine the scatter function, it is advantageous if several light sources are arranged in the illumination ring, which emit light at different wavelengths. In this connection, it is advantageous if the number of light sources is correlated with a wavelength having the scatter and absorption capacity (scatter function) of the skin at this wavelength, so that light having a wavelength the scatter function of which leads to a greater attenuation of the intensity at the given distance, is irradiated in at the irradiation point, by way of the illumination ring having an averaged irradiation intensity, in order to thereby obtain a sufficient measurement signal, which is comparable with the measurement signals of other wavelengths, with regard to intensity.

Alternatively, there is also the possibility that the diameter of the ring-shaped illumination pattern is coordinated with the wavelength emitted by the light source and the scatter and absorption capacity (scatter function) of the skin, in other words that the intensity of the irradiated light is not varied, but instead the distance of the irradiation point from the detection point is varied, in order to achieve an intensity of the scattered light that can be measured well.

This can be achieved, in particularly simple and therefore preferred manner, in that at least two illumination rings arranged concentric to one another are provided, which emit light of different wavelengths.

Within the scope of the invention, light-emitting diodes are provided as the light sources, which represent a circular ring approximated by a polygon, and generate an approximately ring-shaped illumination pattern by means of separate light spots. The limitation of the circle approximation is overcome in that the illumination ring is formed by a totally reflecting tubular piece consisting of an optical material. The light can be coupled in on its one side; the light passes through the tubular piece and is reflected multiple times between the walls of the tubular piece, in this connection; in this way, it is uniformly distributed over the circumference and thereby results in a uniformly illuminated circular ring having a corresponding illumination pattern. In this connection, the surface on the exit side of the tubular piece can be made rough.

It is furthermore possible that lasers are used as light sources. Furthermore, a lens for imaging the light source on the skin is provided. In order to reduce the sensitivity of the measurement apparatus to de-focusing, i.e. in order to obtain error-free measurement values in a certain depth of definition range, the detector is assigned to a central bore of the lens, in other words a coaxial measurement arrangement is selected.

A compact construction of the device is achieved in that a mirror is arranged in the beam path between the light sources and the lens that serves to image the illumination pattern on the skin, which mirror deflects the beam path in such a manner that the lens is arranged adjacent to or in the interior of the tubular piece.

The generation of an illumination pattern is also possible by means of a conventional projector arrangement, consisting of a light source, a condenser, a projection pattern copy, and a lens assembly, with which the irradiation point is illuminated. Furthermore, laser pattern projectors, such as laser diode circle projectors, for example, are advantageous.

It is also advantageous if a light guide is provided to pass the scattered light to the detector, particularly if the light guide is structured in flexible manner, and therefore can be guided to the detector, which is placed at any desired point, even outside of the beam path.

If relatively many discrete wavelengths must be used for measurements in the case of demanding technical solutions for application cases with high security requirements, the technical expenditure becomes very great, for implementing this with a correspondingly high number of light sources and illumination rings. According to the invention, a spectrometer, for example a grating spectrometer of a simple and thereby cost-effective type, is then arranged in the beam path ahead of the detector, which spectrometer allows a wavelength-dependent evaluation of the scattered light intensity. It is then advantageous if the detector is formed by a photodiode array (PDA) or a charged-couple device (CCD). Furthermore, a brightness sensor is provided for monitoring the brightness of the light source, for example a monitoring measurement diode, which also provides the opportunity of constant adjustment.

Within the scope of the invention, it is advantageous if the irradiation source is assigned to the finger or the inside hand surface of a person and, at the same time, the characteristic line patterns are determined optically, in contact-free manner, using a papillary line sensor, since integration of the check for access authorization with the check for attempts at deception takes place in a single device. In particular, there are advantages because the two measurements with regard to recognition as a living being and with regard to biometric identification, which are to be carried out in contact-free manner, take place essentially at the same time, with close spatial coupling of the measurement regions.

Spatial measurement regions that agree with one another can be achieved if a beam splitter is provided for fade-in of the scattered light generated by the light source and to be measured, into the beam path on the lens assembly side of the papillary line sensor.

It is also possible and preferred if the detector is formed by the camera of the papillary line sensor, whereby the camera is provided for taking pictures of the scattered light reflected by the detection point. When using the camera as a papillary line sensor, it is also advantageous if, in addition to the measurement spot image, a picture of the illumination pattern on the skin is also taken, and measured in the image. In this case, the scattering at the surface of the irradiation point that has the volume scatter imposed on it appears as a reference variable, and stabilization or monitoring of the light source is not absolutely required.

It is furthermore advantageous, when using the camera of the papillary line sensor, if a polarization filter is arranged in the illumination beam path of the scattered light sensor and ahead of the camera, in a crossed position, in each instance, since gloss effects can be avoided in the detection of the capillary line patterns in this way. It is a possibility, as well as advantageous, to use the sensor described in DE 198 18 229 A1 as a papillary line sensor, since a polarization filter is provided ahead of the camera here, in any case, and photometric evaluation of the measurement spot image is possible.

A simple and space-saving illumination assembly can be implemented in that the lens has a central, circular screen assigned to it, and if several light sources are arranged at different distances on the optical axis. In this connection, advantage is taken of the fact that a certain lack of focus of the illumination pattern on the skin is not a problem, so that a plurality of ring images is generated by means of this structure, in simple manner, whereby the only thing that needs to be taken into consideration is that the screen must be sufficiently large with reference to the measurement camera, i.e. the detector.

BRIEF DESCRIPTION OF THE DRAWINGS

The invention will be explained in greater detail in the following, using exemplary embodiments shown in the drawing; the drawing shows.

DETAILED DESCRIPTION OF PREFERRED EMBODIMENTS

Figure 1:
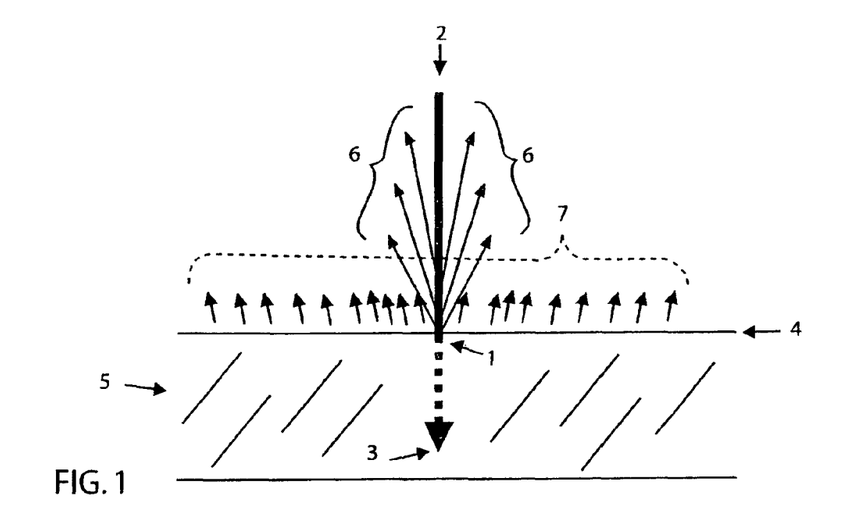
FIG. 1 a schematic representation of the procedures when illuminating skin.
Figure 2:
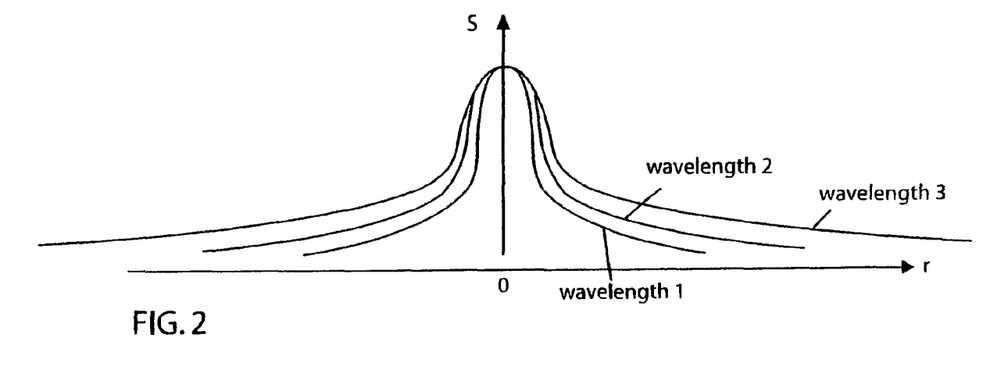
FIG. 2 a graphic representation of the intensity of the scattered light, as a function of the distance r of the detection point from the irradiation point, represented for three different wavelengths, FIG. 3 a representation, corresponding to FIG. 2, of the superimposition of two scatter functions of irradiation points arranged at a distance of 2 R, FIG. 4 a schematic representation of the circular ring, with the detection point arranged in the center, FIG. 5 a schematic representation of the structure of the device according to the invention, with light sources of different wavelengths arranged in different illumination rings, FIG. 6 a representation comparable to FIG. 5, of an alternative embodiment that utilizes totally reflecting tubular pieces, FIG. 7 a representation corresponding to FIG. 5, of another different embodiment having a light guide and an integrated component for the detection and evaluation of the scatter function, by means of a comparator, FIG. 8 a representation corresponding to FIG. 5, with the use of a mirror in the illumination beam path, for shortening the structural shape, FIG. 9 a simple structure for generating several ring patterns, using a screen, and FIG. 10 an alternative arrangement of the light sources and the detector, for interaction with a device for detecting the papillary lines of a finger.
Figure 3:
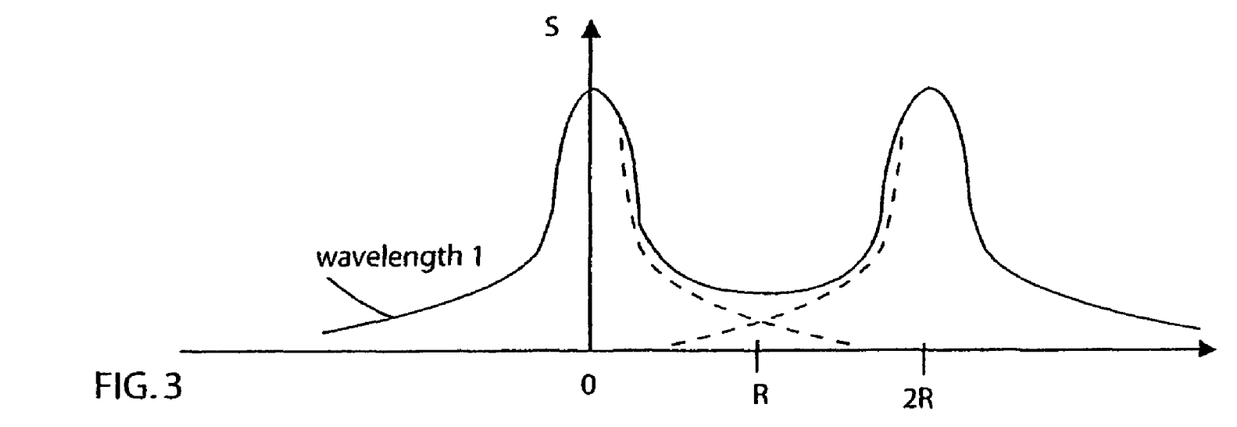
Figure 4:
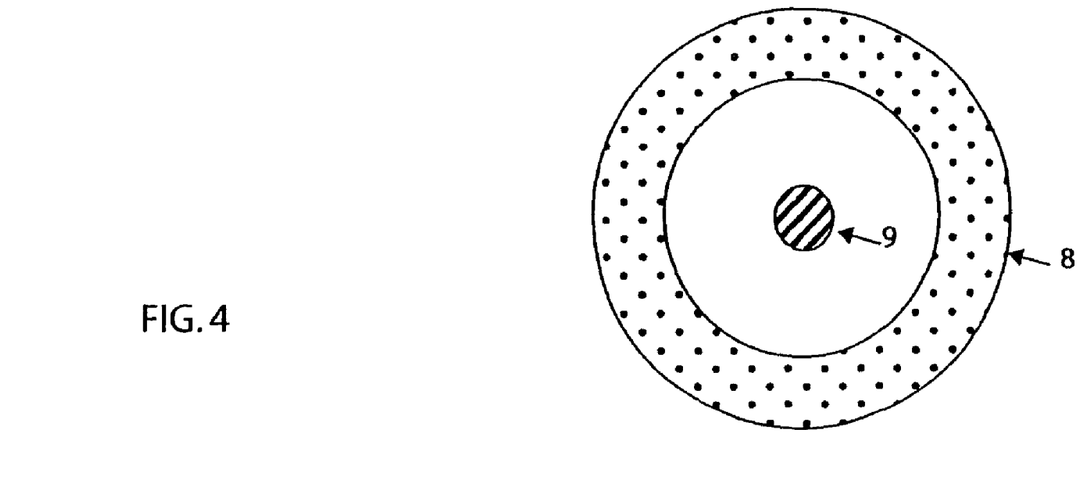

FIG. 1 shows, in simplified form, how the scattered light 7 is formed, if a light beam 2 having a specific intensity and wavelength is radiated in at an irradiation point 1. Part of this light beam 2 is diffusely reflected from the surface of the skin 5, thereby forming the light bundle 6. The other part 3 of the light beam 2 passes through the surface 4 into the tissue of the skin 5, and distributes there by means of multiple scattering. A fraction of this light scattered in the skin 5 exits back out from the skin surface 4 as visible scattered light 7, whereby the intensity of this scattered light 7 depends, in characteristic manner, in accordance with the scatter function S, on the distance of the exit point from the irradiation point 1 as well as on the wavelength of the light radiated in. This dependence, which is subject to laws and leads to a scatter function S, and is caused by the optical material properties of the skin 5, is shown schematically for three different wavelengths in FIG. 2. In order to achieve a sufficiently great signal/noise ratio and in order to form the average over tissue non-homogeneities, the light is irradiated onto the skin 5 in an illumination pattern 8 that corresponds to a circular ring, so that the irradiation point 1 has the shape of this circular ring. In this connection, the detection point 9 is assigned to the center of this circular ring, as shown in FIG. 4. This illumination pattern in the shape of a circular ring leads to a superimposition of all of the scatter functions which result if the scatter functions shown in FIG. 3 are rotated about an axis that goes through half their distance, with the result that a relatively great intensity is available in the center.

Figure 5:
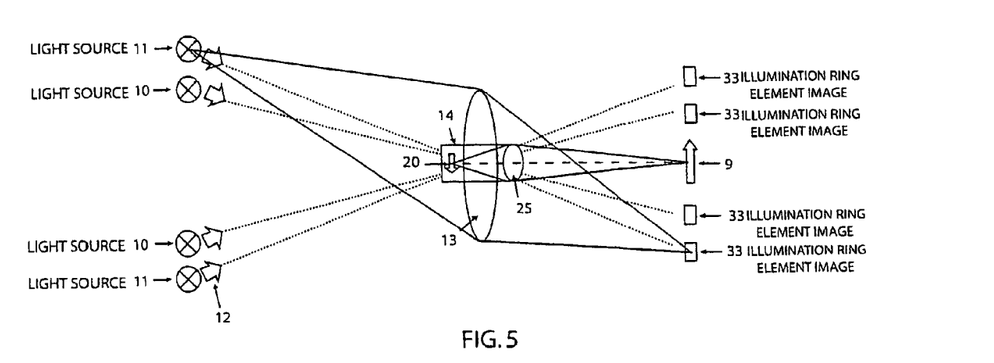

FIG. 5 shows the apparatus structure with which the method for the recognition of natural skin 5 can be carried out, which, in the exemplary embodiment shown, has light sources 10, 11 arranged uniformly over the circumference of two circles arranged concentric to one another, whereby the inner circle has the light sources 10 assigned to it, which generate light having a scatter function S that drops more strongly, e.g. relatively short-wave visible light, or relatively long-wave infrared light.

According to an exemplary embodiment not shown in the drawing, it is alternatively possible to arrange the light sources 10, 11 that generate light of different wavelengths on a single circle, whereby in this case, the numerical ratio of the light sources 10, 11 is adapted to the scatter function S, in other words more short-wave than long-wave light sources 10, 11 are used for visible light.

The bundled light emitted by the light sources 10, 11, indicated by arrows 12, is directed at a lens 13, which images the light sources 10, 11 on the skin 5 as elements 33 of the illumination rings. The scattered light 7 exiting from the detection point 9 is measured using a small measurement camera 14, which is located in a central bore of the lens 13, whereby the measurement camera 14 consists of the lens assembly 25 as well as a detector 20 at the location of the measurement spot image.

Figure 6:
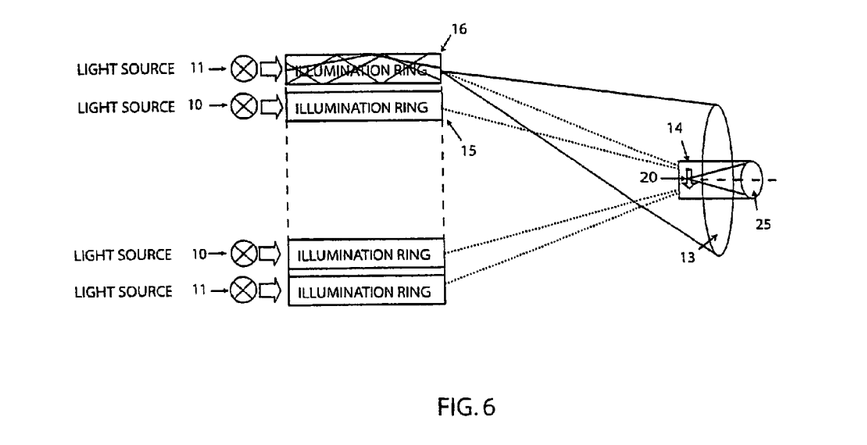
Figure 7:
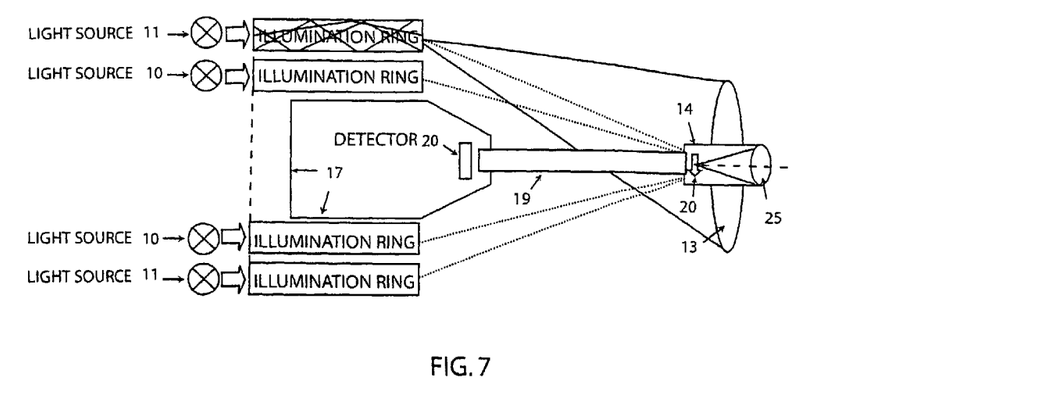

The exemplary embodiment according to FIG. 6 differs from the one of FIG. 5 with regard to the configuration of the illumination. In this exemplary embodiment, the light sources 10, 11 are directed at the entry surfaces of two tubular pieces plugged into one another as illumination rings 15, 16, in which the light is passed to the other side, to the exit surface, on the basis of the total reflection. As an example, the tubular pieces are made of optical material such as acrylic glass. The exit surfaces are slightly roughened, in order to thereby generate two approximately uniformly illuminated ring-shaped sources, which are more advantageous, with regard to the measurement accuracy, than ring segments separated by gaps. FIG. 7 shows the possibility of providing the detector 20 not at the location of the measurement spot image, but rather at the end of a light conductor 19, in a housing 17, which is located in the interior of the tubular pieces, whereby this housing 17 at the same time also contains the other components that are required for completing the device, such as, for example, the comparator, the power supply, and the like.

Figure 8:
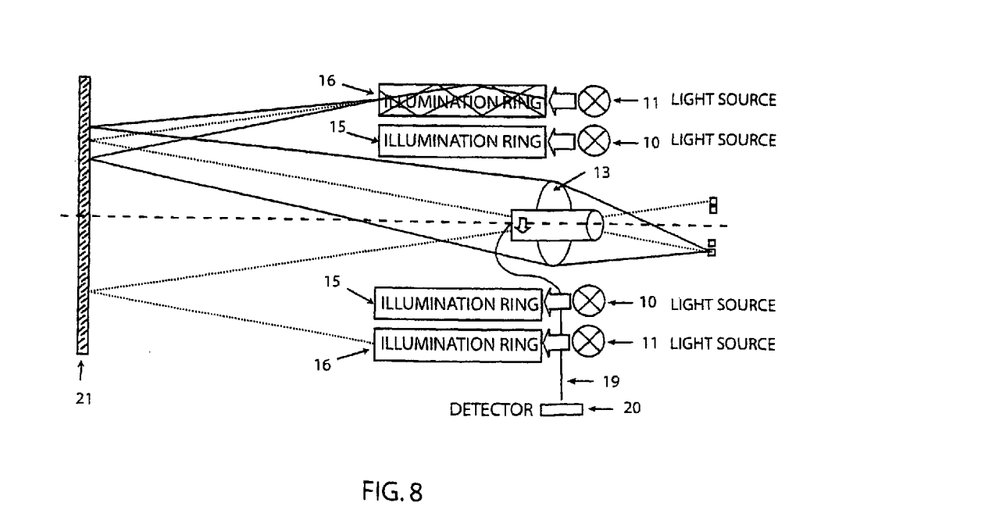
Figure 9:
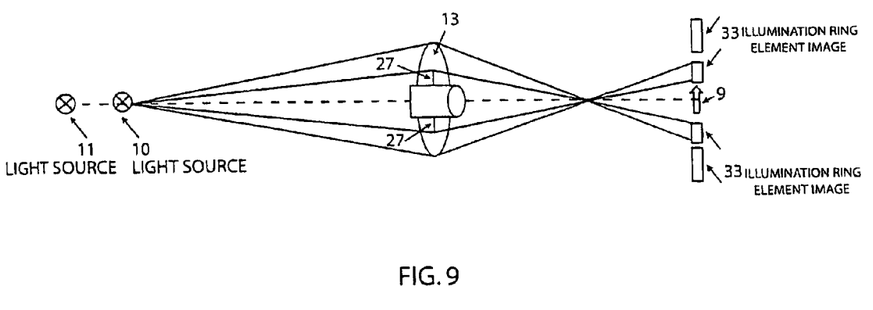
Figure 10:
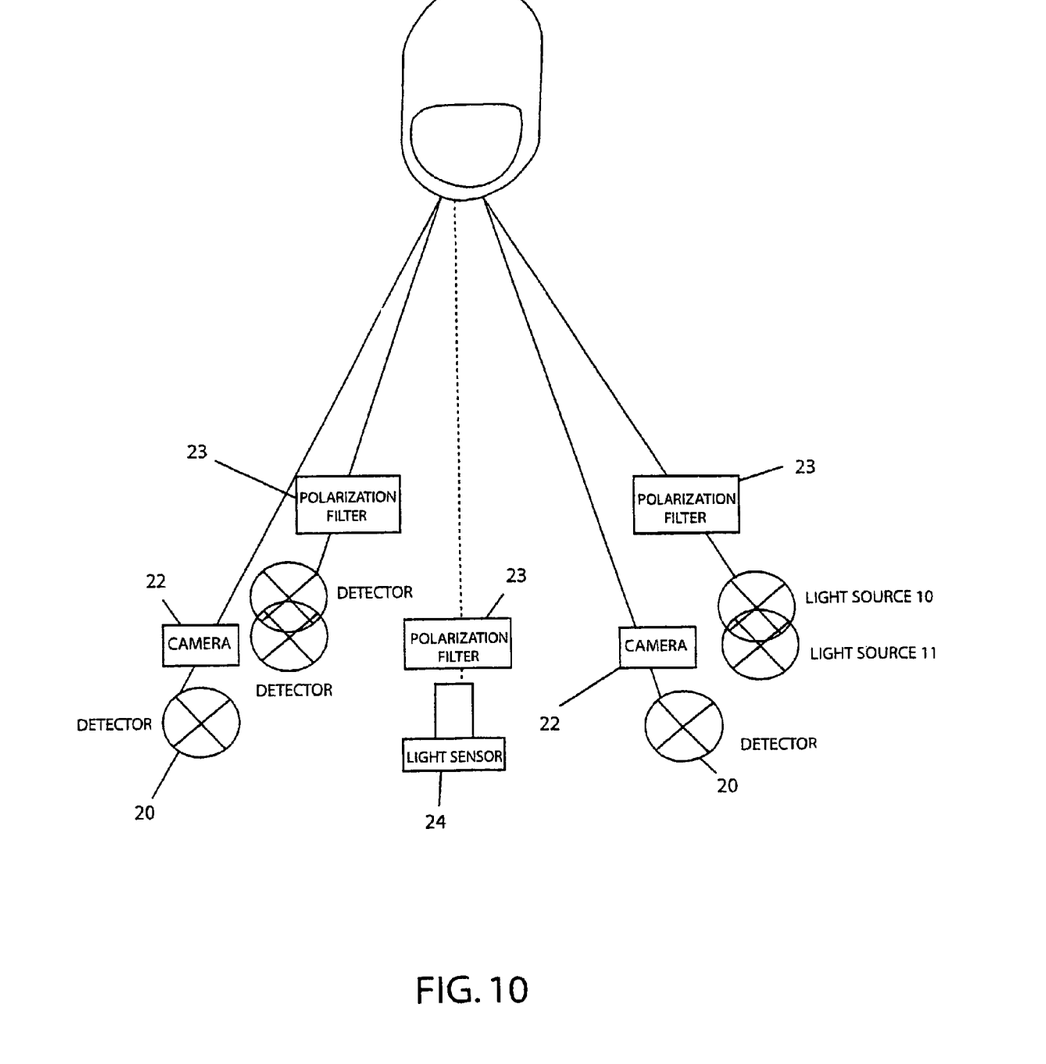

The housing does not necessarily have to be arranged in the interior of the tubular pieces. FIG. 8 shows the use of a flexible light guide 19, which leads to a detector 20 that is placed at a different location, fundamentally any desired location. FIG. 8 also shows the use of a mirror 21 in the beam path between the light sources 10, 11 and the lens 13, in order to thereby achieve a more compact structural shape of the device. The arrangement of a spectrometer in the beam path ahead of the detector 20, in order to allow a wave-dependent evaluation of the scattered light intensity, even without a special selection of the light source 10, 11, which can accordingly be selected to be broad-band, is not shown. The arrangement of a beam splitter for fade-in of the light generated by the light source 10, 11 in the lens-side beam path of the papillary line sensor 24 is also not shown, whereby the measurements for detecting the presence of a living being and for identifying a person can be carried out at the identical position, fundamentally using the same detector 20, namely the camera 22 of the papillary line sensor 24, which is known from DE 198 18 229 A1 and therefore does not have to be described in detail. FIG. 9 schematically shows the previously known capillary line sensor 24, with which "fingerprints," in particular, can be determined optically, in contact-free manner. The papillary line pattern is illuminated by means of the light source 10, 11, and detected using the camera 22, whereby a polarization filter 23 is arranged both in the illumination light beam and in the detection light beam, in each instance. Depending on the orientation of the polarization filters 23, the pattern of the epidermis or the pattern of the hypodermis can be determined; again, reference is made to DE 198 18 229 A1 with regard to details. In the measurement of the scattered light, only the light that is scattered with a different polarization is measured, and for this purpose, the setting of the polarization direction of the polarization filters 23 is selected to be opposite in direction. The signal of the recording camera 22 is then also evaluated with regard to the scattering properties of natural skin 5.

If one takes into consideration the fact that a certain lack of focus of the illumination pattern 8 on the skin is not disruptive, the relatively simple and space-saving illumination device shown in FIG. 9 can be implemented.

The light source 10 is imaged on the skin in de-focused manner, by means of the lens 13, which is provided with a central, circular screen 27, whereby the latter is not larger than the measurement camera 14. Because of the active ring-shaped pupil of the lens 13, the de-focused image of the light source 10 is also ring-shaped. The second light source 11, having a different wavelength, is positioned on the optical axis in front of or behind the first light source 10, so that a second concentric illumination ring is generated. In this way, several light sources 10, 11 can be arranged on the axis, which generate a corresponding number of ring images. The positions of the light sources 10, 11 result from the ring radii selected.

It is true that the lack of focus and the ring width increase with an increasing ring radius R. However, this can be tolerated, to a great extent, and can be included in the geometrical considerations relating to the design of the arrangement. It is advantageous, in terms of design, if positive and negative de-focusing are combined, as far as the distance between the light sources 10, 11 is concerned.

The invention claimed is:

1. Device for the recognition of natural skin from a living being (5) during touchless biometric identification of a person, wherein characteristic line patterns at a sample area of a finger or palm of the hand are touchlessly determined, the device comprising:
    a papillary line sensor (24) for determination of a characteristic line pattern of skin (5);
    a data processing unit comprising a comparator;
    a plurality of light sources (10,11) having different wavelengths and adjusted for illuminating an irradiation point (1), assigned to the finger or the palm of the hand, with light (2) in a manner precluding at least a part of said sample area from being illuminated; and
    a detector (20) adjusted for detection of a fraction of a part (3) of the light (2), entering at said irradiation point (1) through a skin surface (4) of the person into the skin (5), scattered by skin tissue inside of the skin (5) and exiting from the skin (5) through the skin surface (4) as scattered light (7) at a plurality of detection points (9) wherein said plurality of detection points (9) are disposed at respective different distances from said irradiation point (1) and at respective locations different from said irradiation point (1) and are assigned to the part of the sample area precluded from being illuminated;
    wherein a signal determined by said detector is passed to said comparator and compared with stored data to determine whether said sample area agrees with natural skin based upon a dependence of an intensity of the scattered light on the respective different distances between said plurality of detection points and said irradiation point and on a respective wavelength of the light.

2. Device according to claim 1, wherein said plurality of light sources (10, 11) generate an illumination pattern (8) on the skin (5) that corresponds to an approximate or complete circular ring.

3. Device according to claim 2, wherein said plurality of light sources (10, 11) has an illumination ring (15, 16) assigned to it.

4. Device according to claim 3, wherein said plurality of light sources (10, 11) is arranged in the illumination ring (15, 16), and a first light source of said plurality of light sources emits light at a different wavelength than a second light source of said plurality of light sources.

5. Device according to claim 4, wherein a number of light sources of said plurality of light sources (10, 11) having a certain wavelength is correlated with a scatter and absorption capacity of the skin (5) at the certain wavelength.

6. Device according to claim 3, wherein said illumination ring (15, 16) is formed by a totally reflecting tubular piece consisting of an optical material.

7. Device according to claim 2, wherein a detection point of said plurality of detection points (9) is assigned to a center of the approximate or complete circular ring.

8. Device according to claim 2, wherein a diameter of the illumination pattern (8) is coordinated with a wavelength emitted by a light source of said plurality of light sources (10, 11) and with a scatter and absorption capacity of the skin (5) on which the illumination pattern is generated.

9. Device according to claim 8, further comprising at least two illumination rings (15, 16) arranged concentric to one another which illumination rings emit light of different wavelengths.

10. Device according to claim 2, wherein said illumination pattern (8) is generated at the irradiation point (1) by means of a projector.

11. Device according to claim 10, wherein said illumination pattern (8) is generated by means of a laser pattern projector.

12. Device according to claim 1, wherein said plurality of light sources (10, 11) comprises light emitting diodes.

13. Device according to claim 1, wherein said plurality of light sources (10, 11) comprises lasers.

14. Device according to claim 1, further comprising a lens (13) for imaging said plurality of light sources (10, 11) on the skin (5).

15. Device according to claim 14, wherein said detector (20) is assigned to a central bore of the lens (13).

16. Device according to claim 14, further comprising a mirror (21) arranged in a beam path between said plurality of light sources (10, 11) and the lens (13) that serves to image an illumination pattern (8) on the skin (5), which mirror deflects the beam path in such a manner that the lens (13) is arranged adjacent to or in the interior of a tubular piece forming an illumination ring assigned to said plurality of light sources.

17. Device according to claim 14, wherein said lens (13) has a central, circular screen (27) assigned to it, and wherein several light sources of said plurality of light sources (10, 11) are arranged at different distances on an optical axis.

18. Device according to claim 1, further comprising a light guide (19) for passing the scattered light (7) to the detector (20).

19. Device according to claim 18, wherein said light guide (19) is structured in a flexible manner, and leads to the detector (20), which is arranged at any desired point.

20. Device according to claim 19, further comprising a spectrometer arranged in a beam path ahead of the detector (20).

21. Device according to claim 1, wherein said detector (20) is formed by a photodiode array (PDA).

22. Device according to claim 1, wherein said detector (20) is formed by a charged-couple device (CCD).

23. Device according to claim 1, further comprising a monitor sensor for monitoring a brightness of said plurality of light sources (10, 11).

24. Device according to claim 1, further comprising a beam splitter for fade-in of the light generated by said plurality of light sources (10, 11) and the scattered light to be measured, into a beam path of the papillary line sensor (24) on a lens assembly side.

25. Device according to claim 24, wherein said detector (20) is formed by a camera (22) of the papillary line sensor (24).

26. Device according to claim 25, wherein said camera (22) is adapted to take a picture both of an illumination pattern (8) and of the scattered light (7) reflected at said plurality of detection points (9).

27. Device according to claim 24, further comprising a polarization filter (33) arranged in an illumination beam path of said detector and in a detection beam path, in each instance.

* * * * *